Aug. 15, 1967     E. F. W. GOBIEN     3,335,597
MANUFACTURE OF PULLEYS
Filed Dec. 23, 1964
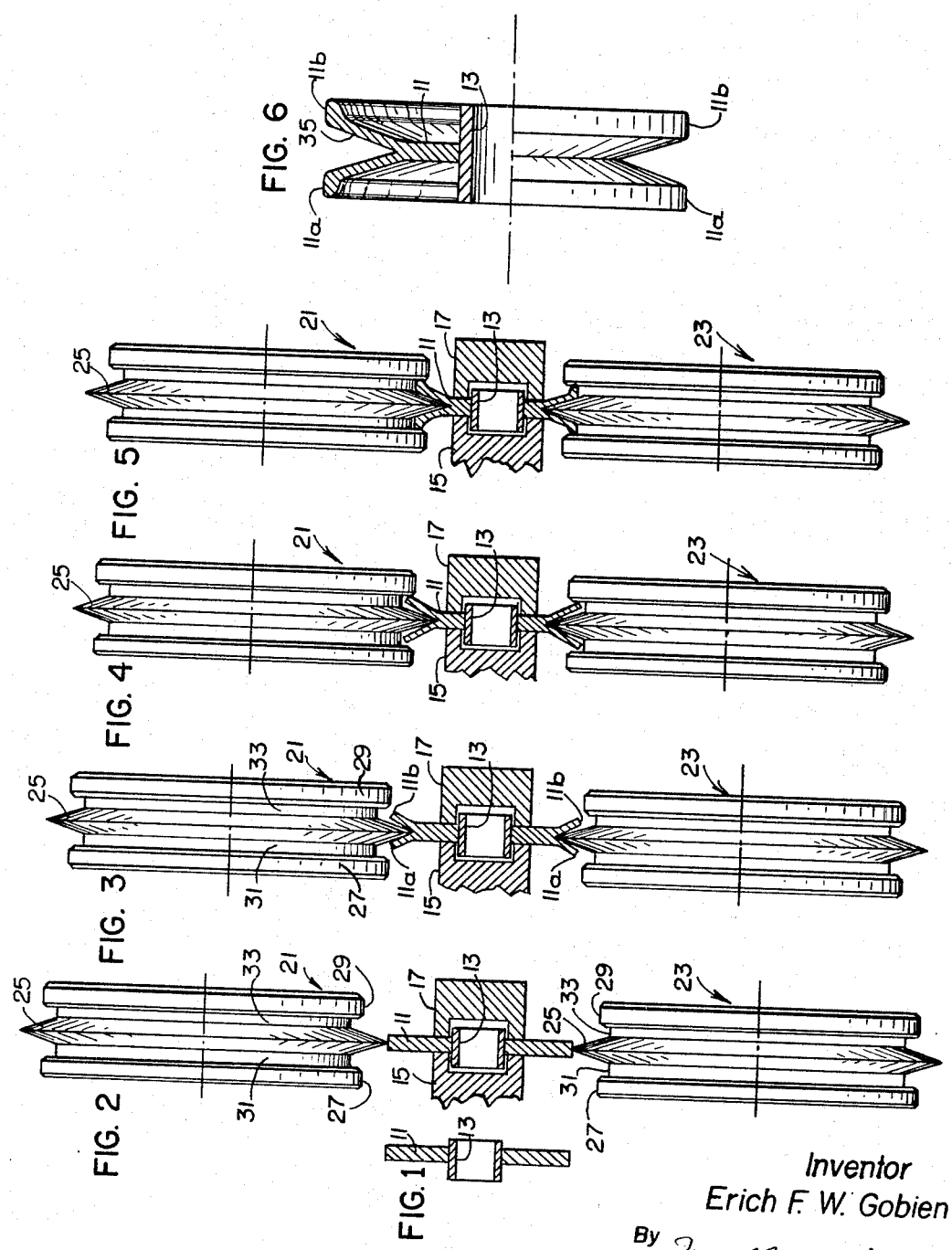
Inventor
Erich F. W. Gobien
By Mueller & Aichele
Attys.

United States Patent Office

3,335,597
Patented Aug. 15, 1967

3,335,597
MANUFACTURE OF PULLEYS
Erich F. W. Gobien, Delevan, N.Y., assignor to Motorola, Inc., Franklin Park, Ill., a corporation of Illinois
Filed Dec. 23, 1964, Ser. No. 420,698
3 Claims. (Cl. 72—377)

This invention relates to the manufacture of pulleys wherein a disc is split by a die to form the pulley groove. The disc is clamped at its center portion leaving an outer portion unsupported and unclamped so that the split portions of the disc are free to expand without constraint by the clamping means. Flanges on the die act to receive the periphery of the split outer portions of the disc to constrain the expanding movement of the split outer portions and to force them against the splitting die to obtain the desired shape of the pulley. Grooves in the die act to engage and roll over the periphery of the split outer portions to strengthen the pulley.

One method of manufacturing pulleys for flexible drive belts is to engage the periphery of a disc shaped pulley blank with a splitting die and split the disc to a desired depth. Heretofore, a forming die of some type has been used to back up the sides of the disc when it split to prevent excess spreading and to form the desired V-shape. Such dies have necessitated complex machine construction and operation, thus adding considerably to the cost of the pulleys. It is desirable that the drive belt contacting surfaces of the pulley be smooth and hard for long belt and pulley life, and that the pulley be strong, rigid and accurate in size. All these factors also contribute to increased cost in that relatively elaborate provisions for practicing the manufacturing process, and in die construction, must be made to accomplish the desired result.

Accordingly, it is an object of this invention to provide an improved method for manufacturing pulleys which is rapid, economical and accurate.

Another object of the invention is to provide an improved method for manufacturing pulleys which provides strong pulleys with long life and with minimized belt wear.

Still another object of the invention is to provide an improved splitting die for the manufacture of pulleys.

A feature of the invention is the provision of a method for manufacturing pulleys which includes splitting a disc and rolling over the edges of the split part outwardly with respect to the split by engagement with the same die used for the splitting operation.

Another feature of the invention is the provision of a circular splitting die for manufacturing a pulley, which die has a surface formed to split a disc shaped pulley blank, confine the split to a predetermined spread, and roll over the edges of the split parts outwardly.

In the drawing:
FIGS. 1 through 5 illustrate the steps in manufacturing a pulley in accordance with the invention, and the die used, with the pulley blank and its support being shown in full section; and FIG. 6 is an elevational view of a completed pulley, half of which is shown in section.

In accordance with the invention, a pulley blank having a circular disc is clamped for rotation about the axis of the disc, with the outer portion of the disc remaining free of engagement. The periphery of the disc is engaged with a circular splitting die and the die and disc are rotated and moved together so the disc is split throughout a substantial part of the free portion. The edges of the split parts of the disc are held against spreading beyond a given amount by engagement with grooves and flanges on the circular splitting die. Such edges are rolled over outwardly with respect to the split by further engagement with the splitting die. A pair of circular splitting dies diametrically opposed on opposite sides of the disc may be used.

The circular splitting die used in the above method is rotatable and comprises a generally wedge shaped circumferential ridge for engaging the periphery of the circular disc for splitting the same and forming the pulley groove. A pair of circumferential die grooves are adjacent the ridge, one on each side thereof, and such grooves are of a depth in relation to the periphery of the ridge which corresponds to the desired depth of the pulley grooves to be formed. The die grooves are formed to confine and roll over the edges of the circular disc being split outwardly with respect to the formed pulley groove, thereby obviating the necessity of separate forming dies.

Referring now more particularly to the drawings, the invention is depicted therein used in the manufacture of a pulley for an alternator in a vehicular electrical system. The pulley is driven by a flexible drive belt to transmit torque from the engine to the alternator. The alternator produces alternating current which is then rectified and utilized to charge the storage battery and/or operate other electrical components of the vehicular electrical system. A pulley of this particular type may be between 2 and 3 inches in diameter and between ¾ and 1 inch wide. Other pulley sizes, however, could be manufactured well within the scope of this invention.

In FIG. 1 the pulley blank is shown in half section. This blank may be a stamped out round steel washer 11 approximately ⁹⁄₆₄ inch thick and which is forced, welded, or shrunk on a section of seamless steel tubing 13. The blanks might also consist of extruded discs, machined parts, or forgings, made of steel, aluminum, bronze, brass or any material that lends itself to a rolling operation.

The pulley blank is clamped between two halves 15 and 17 of a rotatable steel clamp. These clamp halves 15 and 17 surround the tubular portion 13 of the pulley blank and press against the washer 11 proximate the point where the washer joins with the tubular steel portion 13. Accordingly, the outer portion of the disc or washer 11 remains free of engagement. Other methods of clamping the pulley blank for rotation could be used within the scope of the invention.

In the method illustrated in the drawing, the pulley is formed by contacting the pulley blank with a pair of circular splitting dies diametrically opposed on opposite sides of the pulley blank. These dies 21, and 23 are each comprised of a generally wedge shaped circumferential ridge 25 and a pair of circumferential protuberances or flanges 27 and 29 spaced from opposite sides of the ridge 25. Protuberances 27 and 29 form a pair of circumferential die grooves 31 and 33 on one each side of the ridge 25. Grooves 31 and 33 are of a depth in relaiton to the periphery of the ridge 25 which corresponds to the desired depth of the pulley grooves to be formed.

The pulley blank is rotated and the circular splitting dies 21 and 23 are moved toward and spinning pulley blank until, as shown in FIG. 2, the circumferential ridges 25 engage the periphery of the disc 11. The splitting dies are then moved further toward each other, penetrating the outer diameter of the disc 11 as illustrated in FIG. 3. During this process the pulley blank as well as the two circular splitting dies are turning. Either the blank or the two splitting dies may be driven. This turning in the penetration of the rolling dies forms a V-groove in the free or unclamped portion of the pulley blank.

The two sides of the V formed in the disc 11 have a tendency to spread away from each other making it difficult to arrive at a closely controlled shape of the V-groove. As illustrated in FIG. 4, however, the circular splitting dies 21 and 23 have a configuration such that after the ridges 25 thereof have reached a certain depth, the edges 11a and 11b of the split portions of the disc 11 engage the grooves 31 and 33 in the circular splitting dies. The circumferential protuberances or flanges 27 and 29 on the rolling dies will then engage the edges 11a and 11b of the split portions of disc 11 and limit the spreading thereof to a predetermind distance.

Further movement of the circular splitting dies 21 and 23 toward one another, at this point, changes the operation from a splitting operation into a spinning operation. The edges 11a and 11b of the split portions of the disc 11 are confined and formed in the grooves 31 and 33 and are rolled by the circular splitting dies 21 and 23 to an increased wall thickness (see FIG. 5). This produces close conformance of the pulley groove to the shape of the circumferential ridge 25 on the circular splitting dies 21 and 23, resulting in an accurate shape for the pulley groove.

The final result of the operation is shown in FIG. 6 wherein the pulley grooves 35 conform substantially to the shape of the circumferential wedge shaped ridge 25. This splitting and rolling operation produces no chips and therefore is significantly more economical than machining methods which would waste material machined. The inside of the V-groove 35 and the outer diameter of the pulley on the ends of the split portion of washer 11 are smooth and mirror finished. The smoothness of the surfaces, a result of the rolling operation, results in a smooth contact with the pulley belt and consequently in excellent belt life. The slight increase in wall thickness at the outer diameter of the pulley together with the flared out flanges, provides a very strong and rigid pulley construction. The method of the invention produces pulleys which are, in accuracy, equal or superior to precision machined pulleys. The entire operation takes only a few seconds and the rolling action on the belt surface of the pulleys causes work hardening of the metal, leading to longer pulley life.

It may therefore be seen that the invention provides an improved method for manufacturing pulleys which is rapid, economical and accurate. The method provides strong pulleys with a long life and with minimized belt wear. The invention further provides an improved splitting die for the manufacture of such pulleys, which die incorporates a number of functions into a single die.

I claim:
1. Apparatus for forming a pulley having a groove of a desired shape from a pulley blank shaped as a circular disc, including in combination, a die having a circumferential wedge shaped ridge for engaging the periphery of the circular disc for splitting the same, a pair of circumferential die grooves formed in said die adjacent said ridge one on each side thereof, each of said die grooves having a flange and being of a depth whereby the height of said ridge plus the depth of said die grooves corresponds to the desired depth of the pulley groove to be formed, clamping means for clamping and supporting said disc only at a center portion thereof whereby an outer portion of said disc remains unclamped and unsupported, supporting means connected to said die and said clamping means for positioning said die and said disc in desired relationship, said supporting means acting to cause one of said die and said clamping means to rotate and further to move said ridge and said periphery of said disc into engagement to split a substantial part of said outer portion of said disc, said split outer portions of said disc being free to expand outwardly and away from said wedge without being constrained by said clamping means, said flanges acting to engage the periphery of said split outer portions of said disc to force said split portions against said ridge whereby the desired shape of the pulley groove is formed, and said die grooves and said flanges being formed to engage and roll over the periphery of said split outer portions.

2. Apparatus for forming a pulley having a groove of a desired shape from a pulley blank shaped as a circular disc, including in combination, a pair of substantially identical dies each having a circumferential wedge shaped ridge for engaging the periphery of the circular disc for splitting the same, a pair of circumferential die grooves formed in each of said dies adjacent said ridge one on each side thereof, each of said die grooves having a flange and being of a depth whereby the height of said ridge plus the depth of said die grooves corresponds to the desired depth of the pulley groove to be formed, clamping means for clamping and supporting said disc only at a center portion thereof whereby an outer portion of said disc remains unclamped and unsupported, supporting means connected to said dies and said clamping means for positioning said dies on opposite sides of said disc, said supporting means acting to cause said clamping means to rotate and further to move said ridge of each of said pair of dies and said periphery of said disc into engagement to split a substantial part of said outer portion of said disc, said split outer portions of said disc being free to expand outwardly and away from said wedge without being constrained by said clamping means, said flanges acting to engage the periphery of said split outer portions of said disc to force said split portions against each of said ridges whereby the desired shape of the pulley groove is formed, and said die grooves and said flanges being formed to engage and roll over the periphery of said split outer portions.

3. A method of manufacturing a pulley having a groove with a desired shape from a pulley blank having a circular disc, including the following steps: clamping the disc only at the center portion thereof for rotation about the axis of said disc with the outer portion of the disc remaining unclamped and unsupported, contacting the periphery of the disc with a circular splitting die, having a portion with sides shaped to form the groove, rotating the disc and the splitting die, moving such circular splitting die toward the disc for splitting the outer portion of the disc with the split parts moving away from said sides of said circular splitting die and being unconstrained by said clamping means, engaging the peripheral edges of said split parts of said disc with portions of the circular die to force said split parts against said sides of said splitting die to form the groove of the pulley to the desired shape, and rolling over such peripheral edges outwardly with respect to the split by further engagement with the circular splitting die.

References Cited
UNITED STATES PATENTS

| | | | |
|---|---|---|---|
| 1,494,409 | 5/1924 | Bidle | 29—159 |
| 1,494,410 | 5/1924 | Bidle | 29—159 |
| 1,924,962 | 8/1933 | Rosenbaum | 80—16 |
| 2,338,161 | 1/1944 | Ashton | 29—169 |
| 3,087,531 | 4/1963 | Pacak | 29—159 |
| 3,225,425 | 12/1965 | Skinner et al. | 72—71 |

WILLIAM W. DYER, JR, *Primary Examiner.*

GERALD A. DOST, *Examiner.*